United States Patent [19]
Majer

[11] Patent Number: 4,686,115
[45] Date of Patent: Aug. 11, 1987

[54] PROCESS FOR GRANULATING CHEMICAL PRODUCTS AND APPARATUS THEREFOR

[75] Inventor: Rocco Majer, Venezia, Italy

[73] Assignee: Fertimont S.p.A., Milan, Italy

[21] Appl. No.: 819,012

[22] Filed: Jan. 15, 1986

[30] Foreign Application Priority Data

Jan. 18, 1985 [IT] Italy .................. 19141 A/85

[51] Int. Cl.⁴ .............. B05D 3/12; B05D 7/00; A23G 3/26; B05B 17/00
[52] U.S. Cl. .................. 427/212; 118/19; 118/303; 71/64.02; 264/117; 425/222; 427/242; 427/425
[58] Field of Search .......... 118/19, 303; 427/212, 427/213, 220, 242, 425; 71/64.02; 264/117; 425/222

[56] References Cited

U.S. PATENT DOCUMENTS

| | | | |
|---|---|---|---|
| 3,682,569 | 8/1972 | Vagin et al. | 425/78 |
| 3,785,796 | 1/1974 | Mann | 71/64.02 X |
| 4,353,852 | 10/1982 | Tse | 264/37 |
| 4,478,170 | 10/1984 | Bridges | 118/64 |
| 4,507,335 | 3/1985 | Mathur | 425/222 X |
| 4,565,564 | 1/1986 | Backlund | 71/64.02 X |

Primary Examiner—Michael R. Lusignan
Attorney, Agent, or Firm—Stevens, Davis, Miller & Mosher

[57] ABSTRACT

Process for granulating chemical products, according to which process, recycled granules are conveyed to a rotary drum through an end thereof and are lifted by blades protruding from the drum inner surface, thus falling onto an inner fixed structure, which cause the forming of a vertical curtain of granules, onto which curtain a solution containing the product to be granulated is sprayed; the product solidifies on the granules, which granules, after subsequent falls, are coated with a plurality of layers of solid product before leaving the drum through the other end. The process is characterized in that said inner fixed structure is conveying the falling granules in at least two vertical curtains parallel to each other and to the drum axis, while a portion of the granules, on the side of the downward movement of the drum, directly falls, without passing through a vertical curtain, onto a fixed baffle, which is arranged substantially in the lower half of the drum, on the side of the downward movement.

11 Claims, 3 Drawing Figures

PROCESS FOR GRANULATING CHEMICAL PRODUCTS AND APPARATUS THEREFOR

BACKGROUND OF THE INVENTION

The invention concerns a process for granulating chemical products. More in detail, it relates to a process for granulating chemical products, in particular fertilizers (according to which process the granules are caused to grow by stratification), by spraying onto the granules, a concentrated solution (or an aqueous suspension or a melt) containing the product to be granulated.

It is known, from U.S. Pat. No. 4,478,170, to granulate chemical products within a rotary "curtain-drum". The granules, which are partially recycled to the inlet of the drum, are lifted by blades (flights), thanks to the drum rotation, and fall back onto a properly designed fixed inner structure, which causes them to fall in the form of a falling curtain, onto which a concentrated solution (or a suspension or a melt) containing the product to be granulated is sprayed. The granules, onto which more product layers are deposited and solidified, leave the drum from the other end. Such granulation method does not allow however a high output; infact, the amount of granulated product is rather low. An object of the present invention is to provide a process for the granulation of chemical products, allowing to reach a higher output; one more object is to provide an apparatus suited to practise said process.

DISCLOSURE OF THE INVENTION

According to the widest form of the invention, a stream of recycled granules is introduced into the inlet of a rotary drum and is lifted by blades protruding from the inner surface of said drum, whereafter they fall back onto an inner fixed structure, forming a vertical curtain of granules onto which there is sprayed a concentrated aqueous solution (or an aqueous suspension or a melt) containing the product to be granulated; the product solidifies on the granules and as a consequence of subsequent falls the same granules are coated with a plurality of solid product layers before leaving the drum through the outlet. The process according to the invention is characterized in that the falling granules are conveyed in at least two vertical curtains parallel with each other and with the drum axis, while a portion of the granules, on the side of the drum descending movement, directly falls, without passing through any vertical curtain, onto a fixed baffle, substantially in the lower half of the drum, on the side of the descending movement. By directly falling onto said baffle, said portion forms a downflowing bed onto which at least one of the downfalling curtains falls (i.e. substantially the downfalling curtain or curtains existing in the descending half of the drum). Preferably, from 2 to 3 downfalling curtains are utilized. Our invention concerns also an apparatus for such granulation of chemical products. In said apparatus a stream of recycled granules is fed to the inlet of a rotary drum, from the inner wall of which drum blades are protruding, such blades lifting the granules, which fall onto an inner fixed structure, thus forming a vertical curtain of granules. The drum includes fixed manifolds, which are fed from the outside of the drum with a concentrated aqueous solution (or an aqueous suspension or a melt) containing the product to be granulated. Such manifolds are supplied with sprayers for spraying the solution (or the suspension or the melt) onto the vertical curtains of granules. The granules, after having been coated with one or more solid product layers, leave the drum from the outlet. The apparatus is characterized in that more than one fixed inclined planes are substantially arranged in the upper half of the drum, giving rise to the formation of at least two falling curtains, which are parallel with each other and with the drum axis. Near the lower end of said inclined planes, but for the one nearest the ascending wall of the drum, fixed deflector plates are arranged, which grant the vertical fall of the curtains.

The invention will be now described more in detail with reference to the figures, in which.

Figure 2:
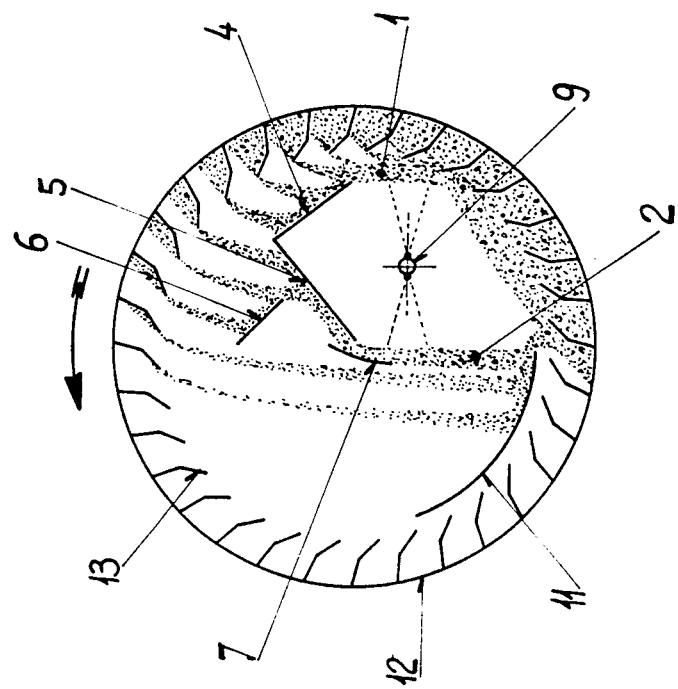
FIG. 2 shows a cross section of a two-curtain rotary drum.

According to FIG. 1, the drum inner wall 12 is provided with blades 13, properly shaped, in order to retain the granules at the beginning of the drum ascending movement and to subsequently set them free; most of the granules fall back onto inclined planes 4, 5 and 6, where they carry on their downward movement. A great portion of the remaining granules directly fall onto the lower baffle 11.

Near the lower end of inclined planes 5 and 6 there are deflector plates 7 and 8, respectively, which grant the vertical fall of the granules falling from the inclined planes hereinabove. Near the lower end of inclined plane 4, which is close to the ascending leg of the drum, no deflector plate is required. Infact, the granules falling from the blades arranged on the right of such lower end do not fall onto the inclined plane, but descend with a vertical movement; as they meet (during their fall) the granules coming from inclined plane 4, they cause a vertical fall of the latter ones. Thus, three vertical downfalling curtains of granules (1, 2 and 3) are obtained.

A concentrated aqueous solution (or an aqueous suspension or a melt) containing the product to be granulated is fed, outside of the drum, to two manifolds 9 and 10, supplied with sprayers; the solution (or suspension or melt) is sprayed onto the curtains.

Curtain 2, to which a greater thickness than that of curtains 1 and 3 can be granted by properly acting on the arrangement of the inclined planes, can be sprayed on both its sides; the solution (or the suspension or the melt) sprayed on the granules solidifies (as a consequence of a properheat exchange) on the surface of the granules during their fall.

The falling granules should not touch any solid surface of the apparatus before their outer coating has completely solidified, otherwise such surface would get dirty. That's why in the lower half of the drum, on the side of the downward movement, a baffle 11 is collecting the portion of granules falling from the descendant side of the drum, without passing through a vertical curtain. By collecting on baffle 11, the granules form a descendingbed onto which at least one of the curtains falls; should such baffle fail, the granules coming from the curtain or curtains would fall in a nearly empty drum area and being still soft, they whuld soil said area. All this does not occur on the baffle, because the still soft granules fall onto a bed of already solidified granules.

Figure 1:
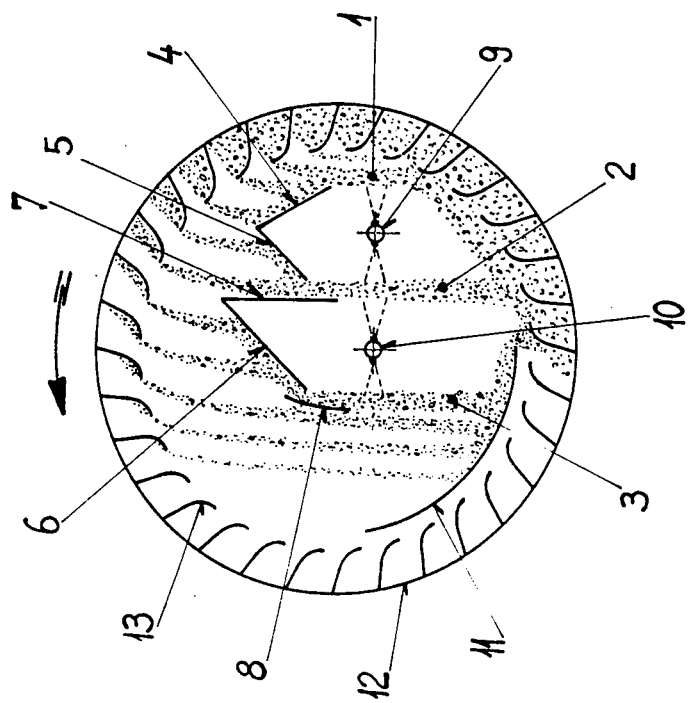
FIG. 1 shows a cross section of a three-curtain rotary drum.
Figure 3:
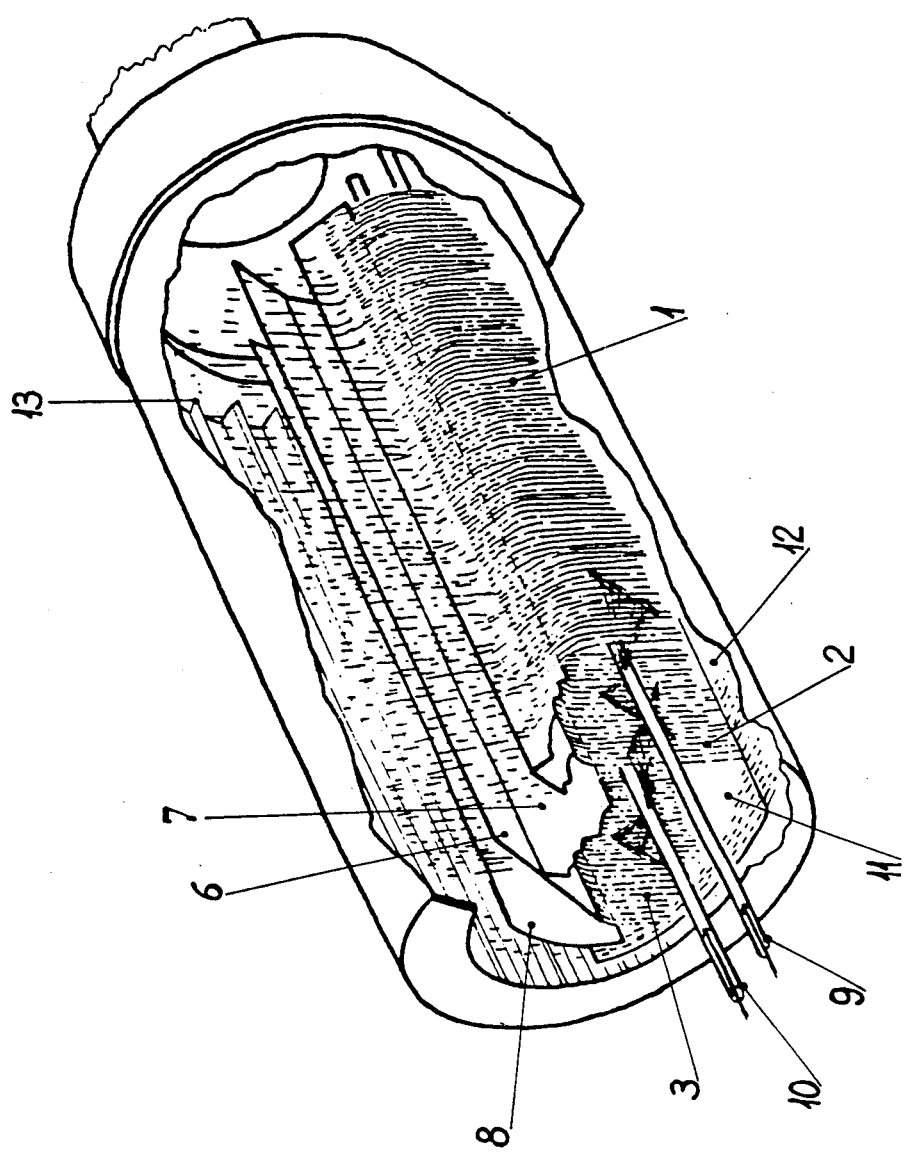
FIG. 3 shows a broken axonometric view of a three-curtain rotary drum, according to FIG. 1.

FIG. 3 shows a broken axonometric view of the same drum of FIG. 1.

FIG. 2 shows a cross section of a rotary drum having two curtains 1 and 2. The inner fixed structure includes three inclined planes 4, 5, 6; a deflector plate 7 granting the vertical fall of the granules (coming from inclined plane 5); a baffle 11 collecting the granules falling from curtaind 2 onto a downcoming granule bed formed by that portion of granules which directly falls onto the baffle, without passing through curtain 2; a manifold 9, supplied with nozzles, spraying the aqueous solution onto curtains 1 and 2.

Number and arrangement of the inclined planes are selected as a function of the number of curtains to be obtained and as a function of the flow rate of each curtain. The plates near the lower edge of the inclined planes are shaped as to grant the vertical fall of the granules coming from the inclined planes: for example they may be flat or bent.

The blades protruding from the drum inner surface are shaped in order to guarantee a proper granule flow and to great the granules a proper distribution.

The blades can be for instance flat with an upraised edge. They can be perpendicular to the tangent line of the drum or they can be sloping in the rotary direction of the drum; the inclination angle generally, is from 0° to 30° (preferably about 15°). The raised edge is inclined, with respect to a line normal to said tangent line, in the rotary direction of the drum; the angle of inclination, generally, ranges from 30° to 60° (preferably about 35°).

The blades can also be shaped as a cup or as any other suitable geometrical form.

Baffle 11 retains a downfalling granule bed onto which at least one of the curtains falls. It can show a bent shape and, in such a case, it can be provided with braking devices on its upper surface; for example it can be supplied with rigs. It can also consist of an inclined plane ending, at its lower end, with a downcomer or a retaining edge; in such case, it can be provided with a vibrating device, in order to obtain a uniform downward movement of the particles.

In order to form, within the granulator, a product hold-up proportioned to the curtain feeding requirements, the outer supporting device of the inclined planes and of the deflector plates is provided with means for regulating the inclination of said inclined planes and plates with respect to the drum axis. Said outer supporting device is also provided with means for adjustng the inclination of the planes and of the plates with respect to the horizontal diameter of the drum. Means for adjustng the relative position of the planes (or of the plates or of the manifolds) should be provided for too.

An air stream, cocurrently with or in countercurrent to the feed direction of the granules, flows, according to the art, through the drum; preferably, the air stream is in equicurrent. When it is necessary to remove heat, cold air is let in; when it is necessary to supply heat, hot air is let in. When the cold air circulation is not sufficient to completely remove the heat to be subtracted, it is possible to cool the recycled granules prior to their entering the drum. The intense circulation of the granules in the drum, provided for by the process according to the invention, improves the heat exchange beteen the granules and the air stream, with respect to the single-curtain granulation system.

According to our invention, infact, it is necessary to recycle a high amount of granules,in order to suitably feed the curtains. In the single-curtain granulator of the art, on the contrary, the limited surface of falling granules onto which the solution is sprayed, limits the apparatus efficiency, which may be expressed as hourly amount of granulated product per useful m³ of apparatus.

In a double-curatain granulator according to our invention (see FIG. 2), the surface of the falling granules, onto which the fluid phase will be sprayed, is substantially double, as compared to the one of a single-curtain granulator, the number of layers (of the granule) being the same.

In the three-curtain granulator of FIG. 1, the surface onto which the fluid step has to be sprayed, is substantially four times greater, taking into account that middle curtain 2 is sprayed on both its sides, wherefore the capacity is substantially four times greater than the one of a single-curtain granulator.

Another advantage of the invention, in comparison with the single-curtain granulator, resides in that it is possible to spray a lesser fluid amount onto the curtains (although maintaining the same capacity of the granulator), thus obtaining a granular product having a greater number of layers, and showing therefore a smaller and more regular structure; it is endowed, by consequence, of higher features, in particular a higher hardness, a lesser tendency to powder, a lesser tendency to being crushed and a higher sphericity.

The following examples better illustrate the invention, whithout limiting in any case the scope thereof.

EXAMPLE 1

A two-curtain apparatus, according to FIG. 2, was utilized for manufacturing urea granules;
the main features of the apparatus were:
length: 6 m
diameter: 2 m
number of blades: 30
revolution speed: 6 rpm.
Molten urea was fed by means of two manifolds arranged on the same line (parallel to the drum axis), said manifolds entering the drum through opposite ends and extending each up to about the middle of the drum. Each manifold carried 30 nozzles arranged on two diametrically opposed rows; the nozzles were of the single-fluid type and the jet had the shape of a flat oval cone. Because of the small size of the nozzles holes, a gauze filter was arranged upstream of the manifolds, in order to retain solid particles, if any. The molten urea had a concentration of 99% by weight (the balance consisting of water) and a temperature of 140° C.; 21,688.7 kg/h of urea were fed at a pressure of 6.5 bar. 62,500 kg/h of granules were then recycled to an end of the drum and 11,500 Nm³/h of air (at 25° C.)were fed in equicurrent. The circulation capacity, inside the drum, was 300,000 kg/h, subdivided as follows:
curtain 1: 100,000 kg/h
curtain 2: 120,000 kg/h
granules directly falling onto lower baffle 11: 80,000 kg/h.
83,335 kg/h of the product left granulator at 100° C. and with a 0.3% relative humidity.
Air left the apparatus at 85° C.;
the fines entrained by the air were removed in a wet separator and recovered. The average residence time of the granules in the apparatus was 110 seconds. At the granulator outlet the product was cooled, in a fluid bed, down to 49° C. and then separated into 3 fractions: grade product (size from 2 to 4 mm), oversize product and undersize product. The coarse fraction was ground and fed back to the granulator along with the fine fraction; the grade fraction was subdivided into 3 streams; one portion to storage as finished product, one portion recycled as such to granulator and one portion bound to be ground together with the coarse fraction. The features of the grade product are on Table 1.

TABLE 1

| | |
|---|---|
| Average particle size (Sauter): | 2.97 mm |
| Number of coatings of the granule: | 9–10 |
| Squeezing load: | |
| on granule having a diameter of 2.5 mm: | 2.5 kg |
| on granule having a diameter of 3 mm: | 3 kg |
| Actual density: | 1319 kg/m$^3$ |
| Apparent density of the granule: | 1263 kg/m$^3$ |
| Bulk density: | 756 kg/m$^3$ |
| Total porosity: | 0.035 cm$^3$/g |
| "Powderiness": | 130 ppm |
| Crushability: | 0.8% |

The total porosity was determined by means of a mercury penetration porosmeter. To determine the powderiness, the product was treated during 5 minutes in a fluidized bed. The fine particles leaving the bed were collected, thus obtaining a value related to the weight of the treated sample. The crushability was measured by means of a rotary drum having a diameter of 200 mm and a length of 60 mm, equipped with 6 fins, radially arranged around the axis; these fins were as long as the drum and had a width of 10 mm.

100 g of product (residual from a screen having a clear size of 1.118 mm) were introduced into the drum, together with 50 steel balls having a 10 mm diameter, and the drum was caused to rotate at 42 rpm during 5 minutes; the balls were then separated from the product, which was subsequently screened on a clear size screen, and the undersize product was weighed and correlated to the weight of the starting product.

EXAMPLE 2

This example concerns the granulation of a ternary fertilizer N:P$_2$O$_5$:K$_2$O=20:10:10 starting from a slurry; the solid phase consisted of calcium sulphate and of calcium and ammonium phosphates and the solution contained NH$_4$NO$_3$, · H$_2$NH$_4$PO$_4$, H(NH$_4$)$_2$PO$_4$ and KCl. The same apparatus of example 1 ws utilized, but the spraying nozzles were of the pneumatic type, suited for suspensions. The slurry had a water content of 10% by weight and a temperature of 110° C.; it was fed at a rate of 22,500 kg/h. The recycled solid product, having a water cntent of about 1%, entered the granulator at 73° C., with a flowrate of 123,000 kg/h. 11,250 Nm$^3$/h of air at 25° C. were then fed in equicurrent with the solid recycled product. The product left the granulator at a flowrate of about 141,000 kg/h, at 80° C. and with a moisture content of 2%. Air left the apparatus at 65° C.; the product was dried up to 1% of water and cooled to 73° C. in a rotary drum. It was then screened and subdivided into three fractions: grade fraction (2–4 mm), oversize fraction and undersize fraction. The coarse product was ground and, after having been combined with the fine product and with a portion of the grade-product (either as such or grond), did flow back to the granulator.

EXAMPLE 3

This example relates to the granulation of a concentrated solution of potassium nitrate;
the same apparatus of example 1 was utilized. The solution contained 80% by weight of KNO$_3$ (the balance being water) and had a temperature of 100° C.;
the solution was fed at a flowrate of 5,000 kg/h. The solid recycle, having a water content of 1%, entered the granulator at 44° C., at a flowrate of 15,000 kg/h. 15,000 Nm$^3$/h of air at 110° C. were then fed, in equicurrent, with the solid recycle. The product left the granulator at a rate of 19,000 kg/h, at 80° C. and with a water content of 1%. Air left the apparatus at 60° C. and with a relative humidity of 50%. The product was cooled and screened and the various fractions were distributed as in example 1.

What is claimed is:

1. A process for granulating urea, wherein a stream of recycled granules is introduced through the inlet of a rotary drum, is lifted by flights protruding from the inner surface of said drum, and falls onto a fixed inner structure causing the formation of a vertical curtain of granules onto which there is sprayed a concentrated aqueous solution or an aqueous suspension or a melt containing the urea to be granulated, whereby the granules become coated with a plurality of solid layers before leaving the outlet of the drum, and wherein said fixed structure conveys the downfalling granules in at least two vertical curtains, parallel with each other and with the drum axis, characterized in that one portion of the granules, on the side of the downward movement of the drum, direcly falls, without touching any of said structures and without passing through any vertical curtain, onto a fixed baffle, substantially arranged in the lower half of the drum on the side of the downward movement, such granules thus forming a descending bed of granules onto which at least one of the downfalling curtains falls.

2. A process according to claim 1, characterized in that the falling granules are subdivided into 2 or 3 curtains, with the proviso that, when 3 curtains are present, the middle curtain is sprayed by said urea-containing solution, suspension or melt on both its sides.

3. Apparatus for granulating urea, in which recycled granules are fed to the inlet of a rotary drum, from whose inner wall flights protrude for lifting the granules, which then partially fall onto a fixed inner structure, consisting of inclined planes which direct the fall so as to form vertical curtains of granules, and wherein fixed manifolds fed, from outside the drum, with an aqueous concentrated solution or an aqueous suspension or a melt containing the product to be granulated, are provided with spraying nozzles and wherein the granules leave the outlet of the drum coated with a plurality of solid layers, characterized in that more than one of said inclined planes is substantially arranged in the uppermost half of the drum, directing the fall of the lifted granules and giving rise to at least two downfalling curtains of granules parallel with each other and with the drum axis, each of said curtains being sprayed at least on one face by said nozzles, and wherein, near the lower end of the inclined planes, except for the one closest to the ascending drum wall, fixed deflector plates are arranged, which create the vertical fall of the curtains, and wherein a fixed baffle is arranged substantially in the lower half of the drum, on the side of the downward movement, thereby collecting the descending granules in the form of a bed onto which at least one of the curtains falls.

4. An apparatus according to claim 3, wherein said flights are flat blades having a raised edge, said blades being perpendicular to the drum tangent line or inclined in the drum rotarydirection, the angle of inclination being from 0° to 30°, while the raised edge is inclined, with respect to the line normal to said drum tangent line, in the rotary direction of the drum, the angle of inclination being from 30° to 60°.

5. An apparatus according to claim 3, wherein said blades are cup-shaped.

6. An apparatus according to claim 3, wherein said baffle has a bent shape.

7. An apparatus according to claim 6, wherein the bent baffle is provided with braking devices on its upper surface, preferable in the form of ribs.

8. An apparatus according to claim 3, wherein said baffle is an inclined plane, ending at its lower end with a downcomer or a retaining edge.

9. An apparatus according to claim 8, wherein said baffle is supplied with a vibrating device.

10. An apparatus according to claim 3, wherein the outer supporting device of the inclined planes and of the deflector plates is supplied with means for adjusting the inclination of said planes and plates.

11. An apparatus according to claim 3, wherein the ratio between the length and the diameter of the rotary drum is substantially equal to or greater than 3:1.

* * * * *